United States Patent
Sterner et al.

(10) Patent No.: US 7,603,859 B2
(45) Date of Patent: Oct. 20, 2009

(54) METHOD AND CONTROL DEVICE FOR A TURBOCHARGER HAVING A VARIABLE TURBINE FLOW CROSS SECTION

(75) Inventors: Andreas Sterner, Moeglingen (DE); Matthias Hofstetter, Ringsheim (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 282 days.

(21) Appl. No.: 11/656,380

(22) Filed: Jan. 23, 2007

(65) Prior Publication Data

US 2007/0169478 A1    Jul. 26, 2007

(30) Foreign Application Priority Data

Jan. 24, 2006    (DE) ................ 10 2006 003 539

(51) Int. Cl.
*F02D 23/00*    (2006.01)
*F02B 37/22*    (2006.01)

(52) U.S. Cl. ..................................... 60/602
(58) Field of Classification Search ......... 60/600–603
See application file for complete search history.

(56) References Cited

U.S. PATENT DOCUMENTS

| 4,732,003 | A | * | 3/1988 | Ueno et al. ............ 60/602 |
| 4,773,225 | A | * | 9/1988 | Bachschmid et al. ........ 60/603 |
| 5,076,060 | A | * | 12/1991 | Adeff ............ 60/608 |
| 5,174,119 | A | * | 12/1992 | Hanauer et al. ............ 60/602 |
| 6,067,798 | A | * | 5/2000 | Okada et al. ............ 60/602 |
| 6,769,255 | B2 | * | 8/2004 | Nishiyama et al. ............ 60/602 |
| 6,962,481 | B2 | | 11/2005 | Knauer et al. ............ 415/160 |
| 2005/0226718 | A1 | | 10/2005 | Marcis et al. ............ 415/163 |

FOREIGN PATENT DOCUMENTS

| DE | 30 02 701 A1 | 7/1981 |
| DE | 102 62 006 B4 | 9/2005 |
| EP | 0 189 121 A1 | 7/1986 |
| EP | 1 079 083 A2 | 2/2001 |
| EP | 1 099 838 A1 | 5/2001 |
| WO | WO 01/11197 A1 | 2/2001 |

OTHER PUBLICATIONS

European Search Report dated Apr. 30, 2007 (Three (3) pages).

* cited by examiner

*Primary Examiner*—Thai Ba Trieu

(57) ABSTRACT

An actual value of a turbine flow cross section of a turbocharger of an internal combustion engine in a motor vehicle is set for a change in the load on the internal combustion engine from a larger load value to a smaller load value. The actual value setting of the smaller load value is delayed to a setpoint value that is specified for the smaller load value under stationary conditions. A device controls the progression of the method.

20 Claims, 4 Drawing Sheets

METHOD AND CONTROL DEVICE FOR A TURBOCHARGER HAVING A VARIABLE TURBINE FLOW CROSS SECTION

RELATED APPLICATIONS

This application claims priority to German Patent Application No. 10 2006 003 539.9, filed Jan. 24, 2006, the disclosure of which is incorporated herein by reference in its entirety.

BACKGROUND AND SUMMARY OF THE INVENTION

The present invention relates to a method and a control device for setting an actual value of a turbine flow cross section of a motor vehicle internal combustion engine turbocharger for a change in the load on the internal combustion engine from a larger load value to a smaller load value. The time derivative of the load is then negative, so that such a load change may also be referred to as negative load change.

"Load on the internal combustion engine" is primarily understood to be the actual fuel charge normalized to a maximum possible fuel charge of a combustion chamber of the internal combustion engine with a combustible mixture. The relative fuel charge is an essential manipulated variable for setting the torque supplied by the internal combustion engine.

The aforementioned method is known from the "Die Bibliothek der Technik [Technology Library] series, Volume 103, Exhaust Gas Turbochargers," Verlag Moderne Industrie, D-86896 Landsberg/Lech, ISBN 3-478-93263-7, page 40. This literature reference deals with a turbocharger having variable turbine geometry (VTG) in which the turbine flow cross section is reduced by closing guide blades in order to produce a greater pressure drop between the turbine inlet and the turbine outlet. For an acceleration from low rotational speeds the guide blades should be closed to obtain the maximum energy from the exhaust gas. The blades also open with increasing rotational speed and adapt to the particular operating point.

The guide blades are situated in an annular gap through which exhaust gas flows from the outside. A radial orientation of the guide blades results in a smaller turbine flow cross section than for a tangential orientation of the guide blades. For spark ignition engines, the exhaust gas temperature upstream from the turbine may fluctuate in a range from several hundred ° C. to greater than 1000° C. Due to the resulting high thermal load on the guide blades and the soot and/or carbonized oil particles that accumulate over time upstream from the turbine, the guide blades in the annular cross section may jam.

In known systems, jamming of the guide blades is detected by onboard diagnostics during operation of the motor vehicle, and the internal combustion engine is switched to emergency mode to avoid consequent damage to the turbocharger and/or the internal combustion engine. This is noticeable to the driver and is perceived as a drawback. When the guide blades jam in an almost open position, this results in, for example, significant loss of the maximum achievable torque when accelerating from initially low rotational speeds.

In light of this background, an object of the present invention is to provide a method and a control device by which switching to emergency mode is avoided to the greatest extent possible, without having to deal with the described consequent damages and/or losses of the maximum achievable torque.

This object has been achieved by a method in which an actual value of the turbine flow cross section to be set for the smaller load value is set in a delayed manner to a setpoint value that is specified for the smaller load value under stationary conditions.

Correspondingly, this object has been further achieved by a device that controls the progression of such a method.

The present invention is based on the finding that jamming usually occurs after a negative load change in the almost open state.

As the result of setting the turbine flow cross section to the setpoint value that is valid for stationary conditions in a delayed manner according to the present invention after a negative load change, to a certain extent the previous history of the instantaneous operating point is taken into account. With regard to the tendency of guide blades to jam, it is thus possible to avoid the critical combination of still hot guide blades and the open guide blade position. As a result, the frequency of jamming of the guide blades and/or their adjustment mechanisms may be significantly reduced.

It is preferable for the setpoint value that is to be specified under stationary conditions to be set by specifying a progression of setpoint values that results in the setpoint value that is to be specified under stationary conditions.

This ensures that the setpoint value that is valid for stationary conditions is achieved when the tendency to jam has been reduced. Specifying a progression of setpoint values allows the reduction of the jamming tendency to be optimized.

It is also preferable for the progression to be specified as a function of operating parameters of the internal combustion engine.

Thus, at least one of the following variables is typically considered: combustion chamber fuel charge, rotational speed, exhaust gas temperature, and cumulative mass air flow rate.

Each of these variables, alone or in combination with one or more of the other variables, represents a measure of the heat transported by the exhaust gas mass flow, and thus also for the heating and risk of jamming. This embodiment thus allows the adjustment of the guide blades to be limited or delayed as a function of a modeled jamming risk.

It is also preferable for the operating parameters to be dependent on the surroundings in which the internal combustion engine is operated. Such operating parameters preferably include at least one operating parameter which indicates a pressure or a temperature in the intake system of the internal combustion engine.

This embodiment is based on the finding that, for example, operation at high altitudes with low ambient pressure allows an intermediate position of the blades to be maintained for a longer period, because the associated increased air demand of the turbocharger due to the low ambient pressure does not yet result in critically high combustion chamber fuel charge. Therefore, under these conditions the referenced progression can be extended in time.

Low charge air temperatures are accompanied by correspondingly reduced exhaust gas temperatures, and because of the associated cooling effect allow the progression to be compressed in time.

It is also preferable for the progression to have at least one intermediate value of the turbine flow cross section that is larger than the turbine flow cross section set for the larger load value, and is smaller than the turbine flow cross section that is to be set for the smaller load value under stationary conditions. In other words, the increase in the turbine flow cross section is limited after a negative load change. The guide blades are operated in a position that is further open, but not to the extent as for operation under stationary conditions.

It has been shown that jamming usually occurs in the almost open state, and is facilitated by high temperatures. Thus, jamming occurs in particular in a cumulative manner following a closed position, which is the setting during acceleration. Acceleration with a subsequent extreme reduction in the torque demand thus represents an example of such a critical combination of the instantaneous operating point and its previous history. This critical combination is avoided by the described embodiment.

It is also preferable for a time duration of the delay to be limited to a predetermined maximum value.

As a result of this embodiment, the influence of the previous history is no longer taken into account after achieving the maximum value of the time duration. In this manner, temperature normalization may be taken into consideration which, for example, occurs some time after an acceleration phase as the result of exhaust gas which is once again cooler.

It is also contemplated for a check to be made as to whether a guide blade adjustment mechanism is jammed, and for a breakaway function to be activated in the event of a jam. This embodiment is employed when the guide blades have jammed despite the above-referenced measures. In many cases, this breakaway function causes the previous jammed guide blades to become unjammed, so that switching to emergency mode may be avoided. In another embodiment the breakaway function is periodically repeated. In this way, even severe jamming may be remedied over time and in conjunction with variable exhaust gas temperatures.

In a still further embodiment, a frequency of occurrence of a jamming guide blade adjustment mechanism is determined, and an emergency program is activated when the frequency exceeds a predetermined threshold value.

Jamming guide blades alter the operating characteristics of the internal combustion engine, and result in, for example, changes in the charging pressure and the exhaust gas back pressure. The tolerance for jamming conditions drops with the frequency of their occurrence. Taking into account the frequency when switching to emergency operation avoids switching when the frequency is still tolerable, without preventing switching when the frequency is no longer tolerable. The same advantages are obtained for corresponding embodiments of the control device.

BRIEF DESCRIPTION OF THE DRAWINGS

Other objects, advantages and novel features of the present invention will become apparent from the following description of the invention when considered in conjunction with the accompanying drawings, in which.

DETAILED DESCRIPTION OF THE DRAWINGS

Figure 1:
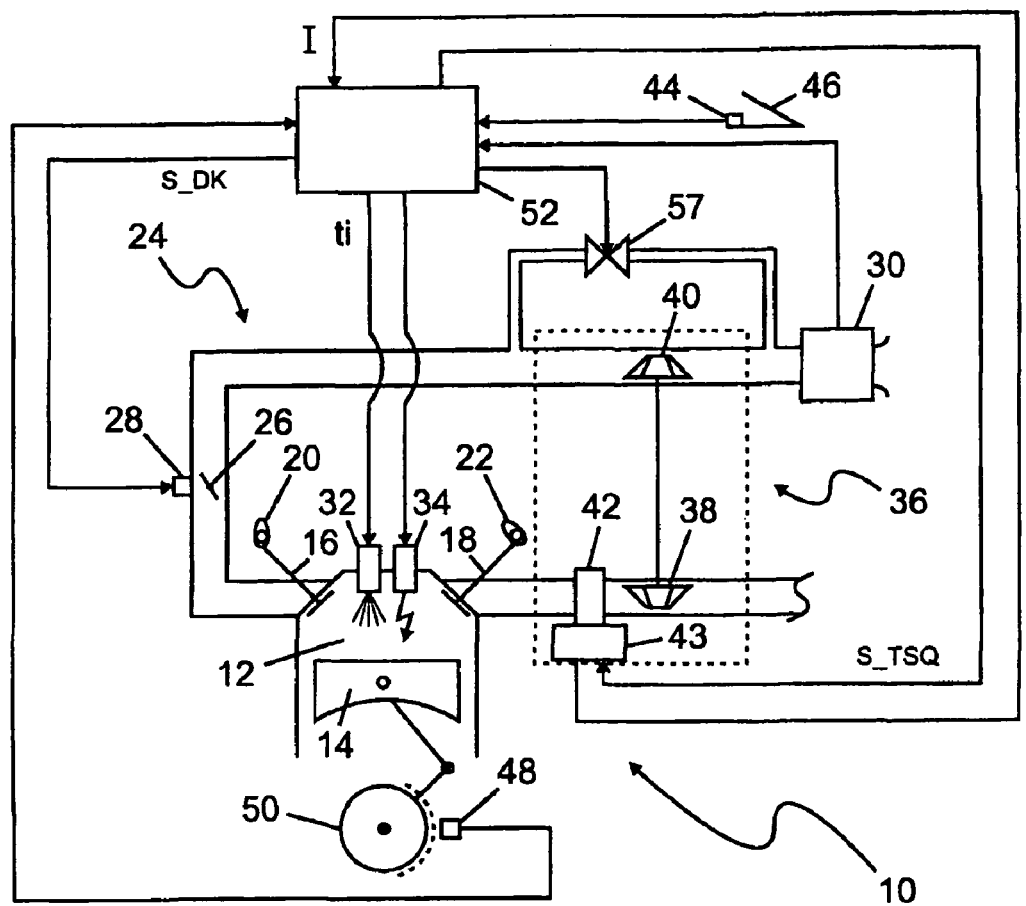
FIG. 1 is a schematic view of an internal combustion engine having a turbocharger with variable turbine geometry.

FIG. 1 shows an internal combustion engine 10 having at least one combustion chamber 12 that is movably compressed by a piston 14. A change in the fuel charge in the combustion chamber 12 is controlled via an intake valve 16 and an exhaust valve 18. The intake valve 16 is actuated by an intake valve controller 20, and the exhaust valve 18 is actuated by an exhaust valve controller 22. In one embodiment, the intake valve controller 20 controls the intake valve 16 with a variable stroke and thus acts as a fuel charge actuator.

When the intake valve 16 is opened, air or a mixture of air and fuel flows from an intake system 24 into the combustion chamber 12. The quantity of incoming air or the incoming mixture is set, alternatively or in addition to a variation in the stroke of the intake valve 16, by way of a throttle valve 26 that is actuated by a throttle valve controller 28. In each case the combustion chamber fuel charge is decisively influenced by the pressure upstream from the throttle valve 26 and/or the intake valve 16 as the respective fuel charge actuator.

The fuel charge in the combustion chamber is preferably measured by a fuel charge sensor 30, that may be implemented as an air mass flow sensor or intake manifold pressure sensor. The fuel is either metered into the intake system 24 (intake manifold injection) or is injected by an injector 32 directly into the combustion chamber 12 (direct injection). In either case, a combustible combustion chamber fuel charge is produced in the combustion chamber 12 that is ignited by a spark plug 34. Waste gas from the combusted fuel charge in the combustion chamber 12 is exhausted through the opened exhaust valve 18.

The internal combustion engine 10 illustrated in FIG. 1 has an exhaust gas turbocharger 36 having a turbine wheel 38 that is driven by the discharged exhaust gas, and that in turn drives a compressor wheel 40 in the intake system 24. The exhaust gas turbocharger 36 also has a controller 42 having an electrical actuator 43 for controlling the geometry of the turbocharger 36. The electrical actuator 43 is typically an electric motor which in conjunction with a mechanism of the controller 42 produces an actuation having a linear or curved progression.

Torque demand from the driver is detected by a driver intention sensor 44 which detects the position of a gas pedal 46 of the motor vehicle. A rotary angle sensor 48 scans angle marks of a sensor wheel 50 attached to a crankshaft of the internal combustion engine 10 in a rotationally fixed manner, thus supplying information on the angular position and angular velocity of the crankshaft.

It is understood that for controlling and/or regulating the internal combustion engine 10 in modern motor vehicles many other sensors may be present to detect the pressures, temperatures, angular positions of camshafts, and/or other operating parameters of the internal combustion engine 10. The invention is therefore not limited to use in an internal combustion engine 10 having only the previously described sensors 30, 44, 48. Thus, in one embodiment the electrical actuator 43 may provide information I on a set guide blade position, i.e., a status report, or also self-diagnostic results.

For controlling the internal combustion engine 10, the signals from the fuel charge sensor 30, the driver intention sensor 44, and the rotary angle sensor 48, the optionally present information I, and, if applicable, the signals from alternative or additional sensors are processed by an engine control device 52 that generates actuating signals therefrom for controlling functions of the internal combustion engine 10. The control device 52 is characterized in particular by the fact that it is designed, in particular programmed, for controlling the progression of the method according to the invention and/or one or more of the embodiments thereof.

In the embodiment of FIG. 1, these signals are essentially throttle valve actuator signals S_DK and signals S_TSQ so that the control device 52 controls a turbine opening cross section TSQ, as well as injection pulse widths ti and ignition signals. An ambient air-pulsed valve 57 likewise controlled by the control device 52 is situated in a bypass for the compressor 40.

Figure 2:
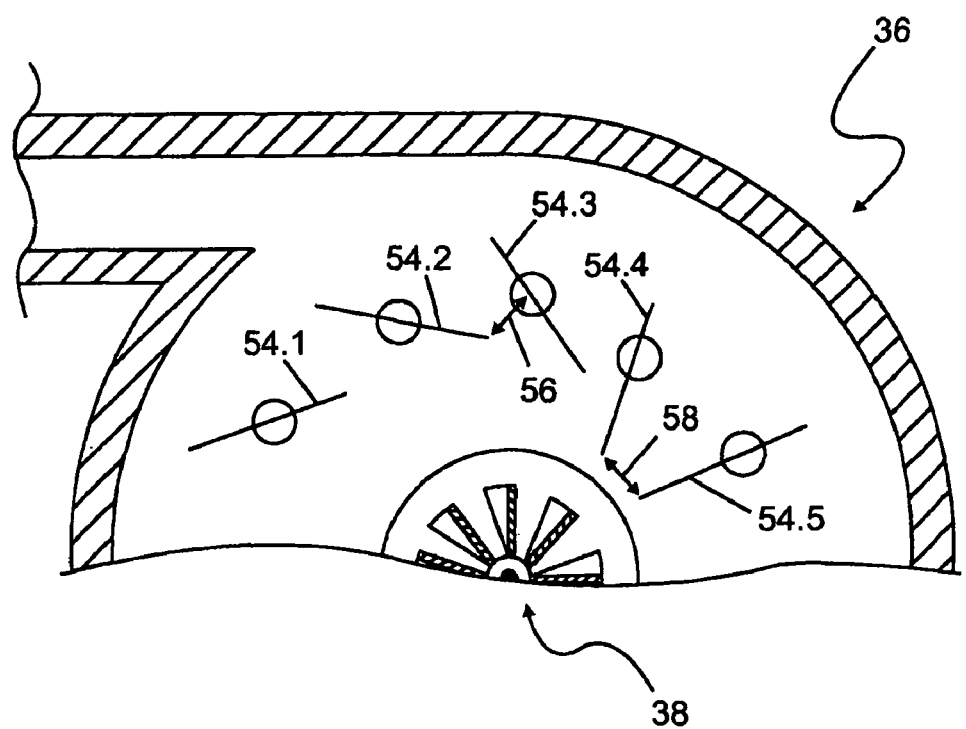
FIG. 2 is a schematic view showing the variation in turbine geometry.

FIG. 2 shows one embodiment of a turbine of a turbocharger 36 having annularly positioned guide blades 54.1, 54.2, 54.3, 54.4, and 54.5. In contrast to the actual situation in which all guide blades 54.1, 54.2, 54.3, 54.4, and 54.5 have the same setting, the guide blades 54.1, 54.2, 54.3 are illustrated in a closed position having a small flow cross section 56, and the guide blades 54.4 and 54.5 are illustrated in a further open position having a larger flow cross section 58. The base charging pressure is represented by the larger flow cross section 58. The adjustment is made by the controller 42 that, for example, actuates an adjusting ring connected to the guide blades via a movable lever. Details of this generally known type of mechanism are not essential for understanding the invention. For an operational adjustment, each of the guide blades is adjusted between the two extreme positions, depending on the torque demand or the load on the internal combustion engine.

It is important only that jamming guide blades are able to remain in a position in which an increased charging pressure is continuously generated. A fuel charge actuator that is opened wide may result in an excessively high combustion chamber fuel charge which, in the absence of countermeasures, may lead to damage to components of the internal combustion engine, such as exhaust valves 18, catalysts, and/or the turbocharger 36. An additional undesired consequence is that the internal combustion engine 10 responds less quickly to torque demand when the guide blades 54.1-54.5 are jammed in the open position.

Figure 3:
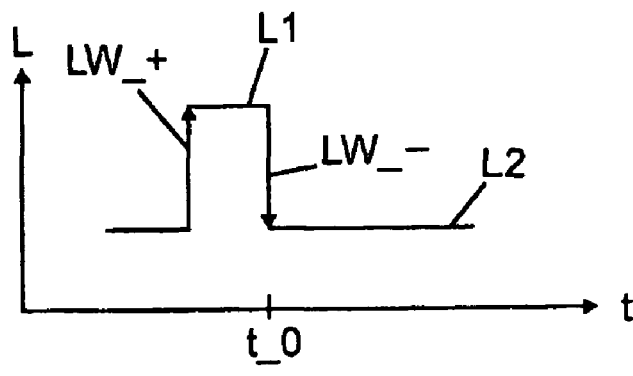
FIG. 3 is a graph showing progression over time of a load on the internal combustion engine during a short-term acceleration process.

FIG. 3 qualitatively shows a progression over time of a load L that is typical for a short-term acceleration process. Starting from a low load, initially a high load is demanded which corresponds to a positive load change LW_+ to a higher load value L1. At time t_0 a negative load change LW_− then occurs, from the high load value L1 to a smaller load value L2. The control device 52 adjusts the corresponding combustion chamber fuel charge by coordinated actuation of the throttle valve 26 by way of the signal S_DK, and of the electrical actuator 43 by way of the signal S_TSQ.

Figure 4:
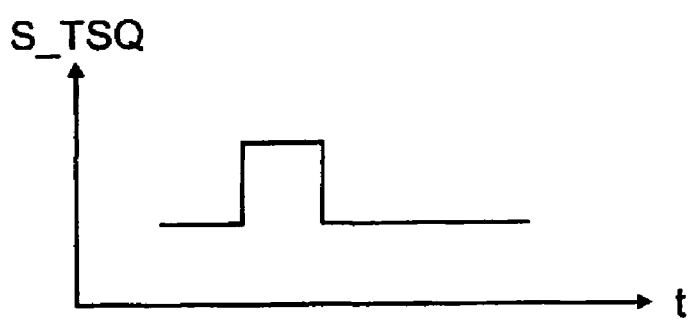
FIG. 4 is a graph showing a progression over time of the turbine flow cross section after a negative load change, according to the prior art.

FIG. 4 qualitatively shows a possible progression over time of the actuating signal S_TSQ or of the setpoint value or the actual value of the turbine flow cross section, as it is set without the method according to the invention. In this known case, the small load value is associated with a small signal S_TSQ which results in open guide blade positions, a small charging pressure, and thus a comparatively low combustion chamber fuel charge. The guide blades 54.1-54.5 are moved into a closed position, which is temporally correlated with the positive load change LW_+, before being moved back into an open position with the negative load change LW_−. In FIG. 4, for the negative load change LW_−, the control device 52 operates with a setpoint value for the signal S_TSQ corresponding to the setpoint value for the smaller load value L2 under stationary conditions. In other words, the guide blades are all moved into the open position that they would assume for the smaller load value L2 under stationary conditions.

In contrast, FIG. 5(a)-(f) show progressions of setpoint values for the manipulated variable S_TSQ that result for the same load signal progression in embodiments of the method according to the present invention. All embodiments share the common feature that the setting to the setpoint value to be specified under stationary conditions is made in a delayed manner following the negative load change LW_−.

The delay is preferably carried out by the fact that, instead of immediately outputting the setpoint value that is valid for stationary conditions, a progression of setpoint values is specified that results in the setpoint value that is to be specified under stationary conditions. Various progressions are possible, of which FIGS. 5(a)-(f) show several examples without the intent of being exhaustive. That is, they are merely exemplary of the progressions contemplated as within the scope of the present invention.

Figure 5A:
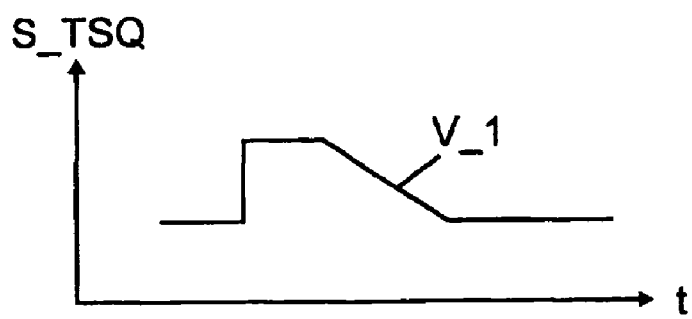
FIGS. 5 (a)-(f) are graphs showing corresponding progressions over time of the turbine flow cross section after a negative load change, according to the method of the invention.
Figure 5B:
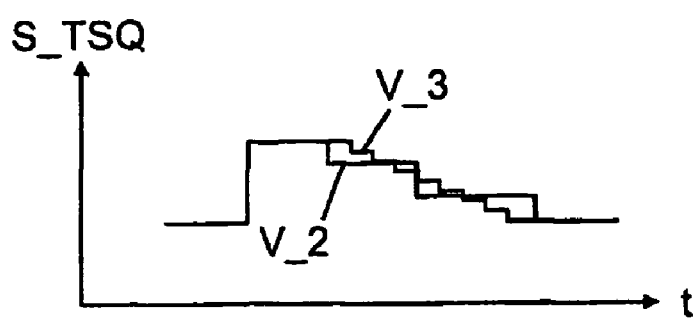
Figure 5C:
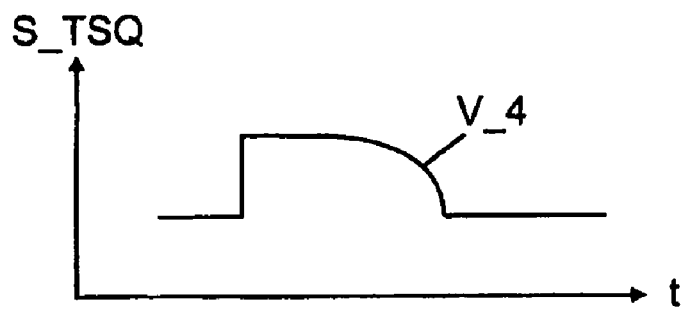
Figure 5D:
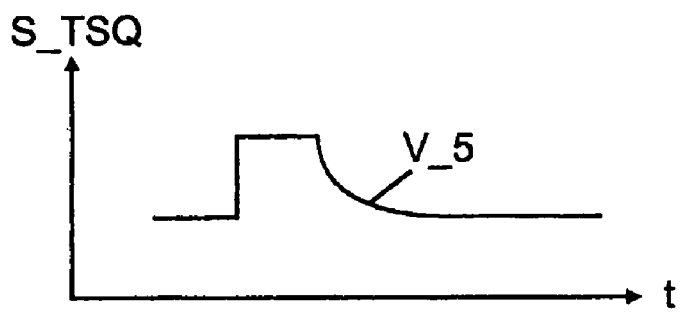

FIG. 5a shows a ramp-shaped progression V_1, FIG. 5b shows step-shaped progressions V_2, V_3 with different numbers of steps and different step heights, and FIGS. 5c and 5d show continuously curved progressions V_4, V_5, whereby in the case of FIG. 5c an initially small slope increases, and in the case of FIG. 5d an initially large slope decreases. The illustrated progressions V_1, . . . , V_5 may also be combined in segments to produce a composite progression.

It is seen that each progression V_1, . . . , V_5 has at least one intermediate value (setpoint value, actual value, or value of the actuating signal S_TSQ) for the turbine flow cross section that is larger than the turbine flow cross section to be set for the larger load value L1, and that is smaller than the turbine flow cross section to be set for the smaller load value L2 under stationary conditions.

Figure 5E:
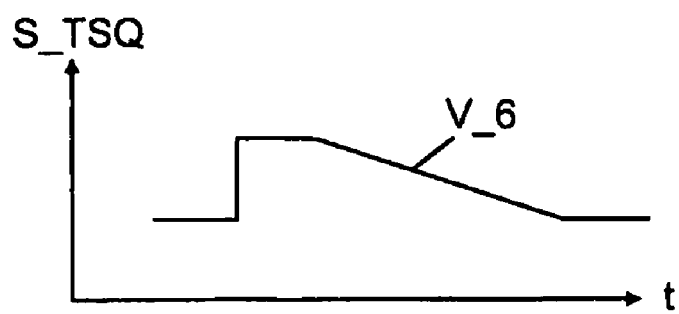
Figure 5F:
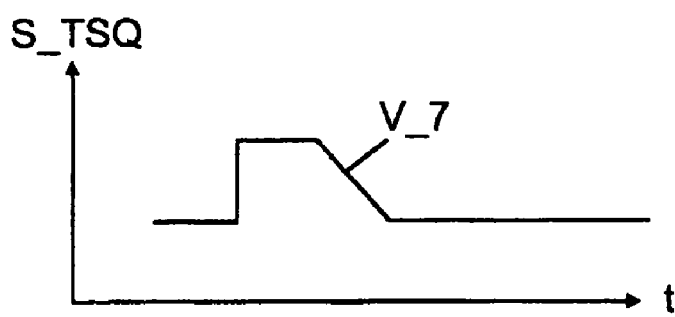

As shown in FIGS. 5e and 5f, the delay may also be variable. The progression V_6 in FIG. 5e proceeds, for example, from the progression V_I in FIG. 5a by extension along the time axis. Similarly, the progression V_7 in FIG. 5f results from a compression. It is understood that the other illustrated progressions V_2, . . . , V_5 illustrated in FIGS. 5(a)-(d) may also be extended or compressed in order to vary the delay by which the guide blades 54.154.5 are moved into the open position adapted for stationary conditions. In one embodiment, the time duration of the delay may be limited to a predetermined maximum value.

As previously mentioned, the control device 52 may specify the delay and/or the specialized progression V_1, . . . , V_7, by which the actual position of the guide blades 54.1-54.5 is also moved into the referenced open position after a negative load change LW_−, as a function of at least one of the following variables: combustion chamber fuel charge, rotational speed, exhaust gas temperature, and cumulative mass air flow rate. Alternatively or additionally, the specification may be made as a function of operating parameters that depend on the surroundings in which the internal combustion engine 10 is operated. Examples of such operating parameters are pressures or temperatures in the intake system 24 of the internal combustion engine 10 such as, for example, a charging pressure, a charge air temperature, or pressures and temperatures upstream from the compressor 40 for the turbocharger 36.

When the guide blade position is changed to a more open position according to the method of the present invention, full opening does not occur immediately, but instead a position is initially set which, for example, is a function of the exhaust gas mass flow. This may optionally change with the exhaust gas mass flow. The desired result is that initially the critical region of almost completely open guide blades 54.1-54.5 after a negative load change LW_– is avoided. In addition, an undesired result is a comparatively large transfer of energy to the turbine wheel 38 and thus a comparatively large air demand on the compressor side when the throttle valve 26 is closed. To avoid pumping of the compressor 40 (see "Exhaust Gas Turbochargers," page 20, paragraph 3) an optionally present ambient air-pulsed valve 57 in FIG. 1 may be opened through which air can flow back from the compressor outlet to the compressor inlet.

As a result of the previously described measures, the error tolerance for controlling the internal combustion engine 10 by preventative measures is increased and prevents jamming of the guide blades 54.1-54.5. Alternatively or additionally, the method, i.e., the delay in setting an open guide blade position, can be activated only after temporary jamming has occurred one or more times. Jamming is determined by a self-diagnostic routine of the controller 42, and together with the position of the jamming guide blades is transmitted to the control device.

To this end, the controller 42 must have a way of determining the guide blade position something that is already known for controllers 42 with status reporting used in series in diesel engines. One known controller 42 having an electrical actuator 43 switches to an emergency program when jamming is detected, and initiates a breakaway function. A breakaway function is understood to mean an oscillating actuation of the guide blade drive for the breakaway of jamming guide blades 54.1-54.5. This breakaway function is performed only once. If the breakaway is not successful for a given number of periods of the actuating signal, in its emergency program the controller 43 continuously sends an error signal to the control device. Positions of the guide blades are not relayed further in the emergency program.

Within the scope of embodiments of the invention, the breakaway function is used in addition to the preventative measures, and also augments the known breakaway function. The augmentation refers to the fact that the control of the breakaway function is taken over by the control device 52. To this end, the blade position is continuously detected and stored in a rolling manner in a RAM cell in the control device 52 (i.e., with every update the old value is replaced by a new value). When jamming is identified, the last known position is used to limit the engine operation only to the extent necessary.

Jamming may optionally be determined by self-diagnosis by the controller 42 or by the control device 52. The control device 52 sends, for example, a setpoint blade position in the form of a pulse duty factor expressed in %, whereas the controller 42 sends an actual blade position in the form of a comparable pulse duty factor. The control device 52 compares both values, and in one embodiment issues an error message for a deviation that is larger than 2.5% and lasts for longer than 2 s. The communication between the control device 52 and the controller occurs via the signal S_TSQ with a variable pulse duty factor. The control device 52 outputs values between 20% and 80% pulse duty factor for controlling the adjustment. The controller 42 reports corresponding values between 20% and 80% pulse duty factor as a status report.

Pulse duty factors from 1 to 19% and from 81 to 100% are outlier pulse duty factors. In one embodiment, a pulse duty factor of 12% signals jamming of the guide blades. A pulse duty factor of 8% signals excessive temperature of the controller 42 or its electrical actuator 43.

If jamming occurs despite the preventative measures, a breakaway function controlled by the control device 52 is triggered by, for example, a routine which is activatable in the controller 42 being actuated by the control device 52. This may be periodically repeated until the guide blades 54.1-54.5 have become unjammed.

The invention claimed is:

1. A method for setting a value of a turbine flow cross section of a turbocharger of an internal combustion engine in a motor vehicle comprising:
    changing a load on the internal combustion engine from a larger load value to a smaller load value as occurs after an acceleration and a subsequent heavy reduction of a torque requirement;
    determining an actual value of the turbine flow cross section; and
    transitioning from actual value of the turbine flow cross section to a setpoint value set for the smaller load value in a delayed manner to avoid a critical combination of hot guide blades and guide blades in an opened guide blade position, wherein said critical combination tends to jam the guide blades.

2. The method according to claim 1, wherein the setpoint value to be specified under stationary conditions is set by specifying a progression of setpoint values that results in the setpoint value which is to be specified under stationary conditions.

3. The method according to claim 2, wherein the progression is specified as a function of operating parameters of the internal combustion engine.

4. The method according to claim 3, wherein the progression is a function of at least one of: combustion chamber fuel charge, rotational speed, exhaust gas temperature, and cumulative mass air flow rate.

5. The method according to claim 3, wherein the operating parameters are dependent on the surroundings in which the internal combustion engine is operated.

6. The method according to claim 5, wherein the operating parameters include at least one operating parameter which indicates a pressure or a temperature in the intake system of the internal combustion engine.

7. The method according to claim 2, wherein the progression has at least one intermediate value of the turbine flow cross section larger than the turbine flow cross section set for the larger load value and is smaller than the turbine flow cross section to be set for the smaller load value under stationary conditions.

8. The method according to claim 1, wherein the delayed manner has a time duration of the delay being limited to a predetermined maximum value of time.

9. The method according to claim 1, further comprising making a check as to whether a guide blade adjustment mechanism is jammed, and activating a breakaway function in the event of a jam.

10. The method according to claim 9, wherein the breakaway function is periodically repeated.

11. The method according to claim 9, further comprising determining a frequency of occurrence of a jamming guide blade adjustment mechanism, and activating an emergency program when the frequency exceeds a predetermined threshold value.

12. The method according to claim 11, wherein the breakaway function is periodically repeated.

13. A controller for setting a value of a turbine flow cross section of a turbocharger of an internal combustion engine in a motor vehicle comprising:

a control device, said control device is configured to receive a change in a load on the internal combustion engine from a larger load value to a smaller load value as occurs after an acceleration and a subsequent heavy reduction of a torque requirement;

said control device is configured to determine an actual value of the turbine flow cross section; and said control device is configured to control a transition from said actual value of the turbine flow cross section to a setpoint value set for the smaller load value in a delayed manner to avoid a critical combination of hot guide blades and guide blades in an opened guide blade position, wherein said critical combination tends to jam the guide blades.

14. The controller according to claim 13, wherein the control device is configured to control a progression of setpoint values that results in the setpoint value to be specified under stationary conditions.

15. The controller according to claim 14, wherein the progression is specified as a function of operating parameters of the internal combustion engine.

16. The controller according to claim 15, wherein the progression is a function of at least one of: combustion chamber fuel charge, rotational speed, exhaust gas temperature, and cumulative mass air flow rate.

17. The controller according to claim 14, wherein the operating parameters are dependent on the surroundings in which the internal combustion engine is operated.

18. The controller according to claim 17, wherein the operating parameters include at least one operating parameter which indicates a pressure or temperature in the intake system of the internal combustion engine.

19. The controller according to claim 14, wherein the progression has at least one intermediate value of the turbine flow cross section larger than the turbine flow cross section set for the larger load value and is smaller than the turbine flow cross section to be set for the smaller load value under stationary conditions.

20. The controller according to claim 13, further comprising making a check as to whether a guide blade adjustment mechanism is jammed, and activating a breakaway function in the event of a jam.

* * * * *